Patented July 21, 1942

2,290,493

UNITED STATES PATENT OFFICE 2,290,493

MEAT TREATMENT

John M. Ramsbottom, Chicago, Ill., assignor to Industrial Patents Corporation, Chicago, Ill., a corporation of Delaware No Drawing. Application February 9, 1940, Serial No. 318,161

12 Claims. (Cl. 99—107)

This invention relates to a method of aging beef.

One of the objects of this invention is to provide an improved method of aging beef.

Another object of this invention is to provide a method of protecting beef during the aging period.

Another object of this invention is to provide a method of preparing and aging beef steaks.

Other objects and advantages of this invention will become apparent from the following description and claims.

Large quantities of beef are aged in the form of beef cuts, particularly the loins from which high grade steaks are cut. The large wholesale cuts are generally placed in a refrigeration chamber and maintained at a temperature of from 33 degrees to 40 degrees F. and held in the chamber for a period of from three to four weeks. During the aging period the proteolytic enzymes naturally present in the animal tissue break down the tough connective tissue and, in effect, partially predigest the meat, resulting in a tender, succulent piece of beef.

As is well known in the art, the portions of the beef which are not protected by fat, such as the cut surfaces, become dehydrated and oxidized during the aging period and become darkened in color. These cut surfaces or other surfaces unprotected by fat afford an excellent medium for the growth of molds, commonly known in the art as "whiskers." To render the aged beef salable, it must be radically trimmed to remove the dehydrated and moldy surfaces.

In aging beef loins which are to be used for steaks, less than two-thirds of the weight of the beef loin is actually used for the intended purposes. The remaining one-third of the weight is used solely for protection and is trimmed from the loin after the aging period. The trimmings are of little value and are disposed of as tankage or may be used in preparing low grade oil. It is apparent that if these trimmings could be removed from the loin prior to aging that these fresh trimmings could be used more advantageously. For example, certain portions could be employed in the manufacture of sausage or high grade oils. During the aging, a further loss is sustained in the loss of an appreciable amount of moisture by evaporation.

The present invention provides a method of aging beef whereby the trimmings may be employed in the manufacture of sausage and high grade oil, and the loss in weight by evaporation or shrinkage is substantially eliminated.

The beef loin may be trimmed prior to aging and the trimmings may, therefore, be employed in the manufacture of sausage and high grade oils. The bloom or bright color of the beef is protected from oxidation and the bloom is substantially the same after aging as before aging.

The present invention contemplates aging beef cuts and steaks in an edible oil which has been substantially saturated with carbon dioxide. Although I prefer to employ oil substantially saturated with carbon dioxide, oil containing no carbon dioxide may be employed. I also prefer to protect the surface of the oil from direct exposure to the atmosphere to prevent absorption of oxygen in the oil and prevent a substantial loss of carbon dioxide from the oil.

It has been proposed to coat the surfaces of various foodstuffs with oil saturated with carbon dioxide. However, I have found that in aging beef the thin film of oil retained by a cut of beef after being dipped into the oil is not sufficient to protect the surfaces of the beef from oxidation and mold growth. The film of oil containing dissolved carbon dioxide will not retain sufficient quantities of carbon dioxide to reduce the growth of microorganisms on the surface of the meat and reduce the action of the enzymes produced by the microorganisms on and adjacent the surface of the meat. The thin film of oil readily absorbs oxygen from the atmosphere which oxidizes the myohemoglobin to myomethoglobin, causing a darkening of the surface.

It has also been proposed to coat the surfaces of meat with gelatin to protect the meat during the aging period. The gelatin coating, like the oil film, will protect the meat for several days, but the thickness of the film is so small that the coating will not protect the meat for the usual three or four week aging period.

In practicing this invention, any edible oil may be employed. Carbon dioxide may be dissolved in the oil by passing gaseous carbon dioxide through the oil or by placing dry ice in the oil and permitting it to evaporate therein. In aging steaks, for example, the steaks may be cut from the loin and placed in the oil which has previously been substantially saturated with carbon dioxide. After the steaks are placed in the oil, the oil should be protected from the air to prevent any appreciable absorption of oxygen and to prevent a substantial loss of carbon dioxide from the oil. The container may be provided with an air tight cover, or a hermetic seal. Other means, for example, wax paper, may be placed in contact with the surface of the oil to protect it from the air and to prevent an appreciable loss of carbon dioxide.

In commercial practice of the invention, the entire beef loin may be placed in a tank containing an edible oil which has been substantially saturated with carbon dioxide, and after the container or tank has been filled with oil and beef loins, an air tight cover may be clamped to the open side of the tank. The loins are then maintained at the desired temperature for from three to four weeks. At the end of the aging period, the loins are removed from the oil and may be trimmed and cut into steaks. Since no shrinkage or evaporation of moisture has occurred, and since the bloom of the surfaces of the meat is substantially the same as when placed in the oil, the trimmings may be employed in the manufacture of high grade products such as sausage and high grade oils.

If desired, the beef loin may be trimmed to steak size and the trimmings may be employed in the manufacture of high grade sausage and No. 1 oleo oil. The trimmed loin is then placed in a tank or container containing an edible oil which has been substantially saturated with carbon dioxide, and the container is then sealed with an air tight cover. The loin is maintained at a temperature of from about 33 degrees to 40 degrees F. for from three to four weeks. At the end of the aging period, the loins are removed from the oil and are cut into steaks.

In the preferred commercial practice of this invention, the beef loin is trimmed and cut into steaks, the trimming being employed in manufacturing sausage and high grade oil.

For example, in supplying the hotel trade, the steaks are placed in a metal container of a capacity of about two gallons and immersed in refined cottonseed oil substantially saturated with carbon dioxide. The size of the container which is used is dependent upon volume of the specific hotel's trade. An air tight cover may then be placed on the open end of the container and the container placed in the refrigeration chamber and held at a temperature of from 33 degrees to 40 degrees F. for a period of from three to four weeks. After aging, the steaks may be removed from the oil as required for consumption.

In comparing the method of the present invention with the conventional method of aging beef, two beef loins were selected for aging. One was fully trimmed and placed in oil substantially saturated with carbon dioxide and the oil then protected from the atmosphere. The second beef loin was aged in a refrigeration chamber in the conventional manner and the loin was in free contact with the atmosphere. Both loins were held in the refrigeration chamber at a temperature of approximately 36 degrees F. for three weeks. The humidity during the aging period was maintained at about 80 per cent relative humidity.

At the end of the three week aging period, the loin was removed from the oil and the two loins were then checked for shrinkage, that is, loss caused by evaporation of moisture. The loin which had been aged in oil exhibited no loss in weight. The loin which had been aged in air in the conventional manner exhibited an evaporation loss of 3.2 per cent.

The color and appearance of the loin aged in oil was entirely satisfactory, and presented about the same bloom and appearance as it did when it was first placed in oil. The loin aged in the conventional manner was covered with mold and slime, necessitating trimming which amounted to approximately 3.2 per cent of the original weight.

The fat surface of the loin aged in oil was bright and had a desirable aroma, whereas the fat surface of the loin aged in the conventional manner was badly discolored and had a somewhat rancid and undesirable odor. The lean surface of the loin aged in oil was far lighter in color than the color of the lean surface of the loin aged in the conventional manner.

The total loss by evaporation and preliminary trimming in the case of the loin aged in the conventional manner was 6.4 per cent as compared to no loss through these causes for the loin aged in oil.

The trimmings from the loin aged in the conventional manner were practically valueless, since the meat was dehydrated and dark in color and the fat portions had a rancid undesirable odor. The trimmings from the loin aged in oil were satisfactory for use in high grade sausage and high grade oils since these trimmings were utilized before the loin was aged. If the loin had not been trimmed prior to aging in oil, the trimmings of the aged loin could be used for the same purposes. Steaks were cut from the two aged loins and broiled. The steaks cut from the loin aged in oil were more tender, were considerably more juicy and had an improved flavor as compared to steaks cut from the loin aged in the conventional manner.

A distinct economic advantage is obtained by the use of the present invention in that the steaks may be cut or the loin may be trimmed prior to aging and it is, therefore, necessary only to hold the desired portions of the meat in the refrigeration chamber during aging.

The carbon dioxide in the oil inhibits the growth of any microorganisms present on the surface of the meat and consequently, retards the action of the enzymes produced by the microorganisms on and adjacent the surface of the meat.

It is apparent that the practice of this invention provides a method whereby beef may be aged without resulting in the large losses accompanying the conventional aging methods and that beef steaks may be aged directly without a loss of product.

I claim:

1. In the aging of beef cuts, the steps of placing the beef cuts in liquid edible oil, and holding the beef cuts in the liquid oil under refrigeration until aged.

2. In the aging of beef cuts, the step of holding the beef cuts in liquid edible oil substantially saturated with carbon dioxide.

3. In the aging of beef cuts, the steps of immersing the beef cuts in edible oil substantially saturated with carbon dioxide, and holding the beef cuts in the oil under refrigeration until aged.

4. The method of aging beef cuts which comprises immersing the beef cuts in edible oil substantially saturated with carbon dioxide, and holding the beef cuts in the oil under refrigeration.

5. The method of aging beef cuts which comprises immersing the beef cuts in edible oil substantially saturated with carbon dioxide, and thereafter holding the beef cuts in the oil at a temperature of from 33 degrees to 40 degrees F. until aged.

6. The method of aging beef cuts which comprises immersing the beef cuts in edible oil substantially saturated with carbon dioxide, and thereafter holding the beef cuts in the oil at a temperature of from 33 degrees to 40 degrees F. for from three to four weeks.

7. In the method of preparing beef steaks, the steps of immersing the steaks in edible oil substantially saturated with carbon dioxide, and holding the steaks in the oil under refrigeration.

8. The method of preparing beef steaks which comprises cutting the steaks from a beef loin, immersing the steaks in edible oil substantially saturated with carbon dioxide, and holding the steaks in the oil under refrigeration.

9. The method of preparing beef steaks which comprises cutting the steaks from a beef loin, immersing the steaks in edible oil substantially saturated with carbon dioxide, and thereafter holding the steaks in the oil at a temperature of from 33 degrees to 40 degrees F. until aged.

10. The method of preparing beef steaks which comprises cutting the steaks from a beef loin, immersing the steaks in edible oil substantially saturated with carbon dioxide, and thereafter holding the steaks in the oil at a temperature of from 33 degrees to 40 degrees F. for a period of from three to four weeks.

11. The method of treating beef cuts to protect the cuts during aging which comprises covering the beef cuts with refined cottonseed oil and storing the product under refrigeration and at temperatures suitable for aging.

12. A method of treating beef cuts to protect the cuts during aging, which comprises covering the beef cuts with liquid edible oil and storing the product for a substantial period of time at temperatures of about 33° to 40° F.

JOHN M. RAMSBOTTOM.